(12) United States Patent
Qiao et al.

(10) Patent No.: US 9,458,743 B2
(45) Date of Patent: Oct. 4, 2016

(54) IRON-BASED ALLOYS AND METHODS OF MAKING AND USE THEREOF

(71) Applicant: L. E. Jones Company, Menominee, MI (US)

(72) Inventors: Cong Yue Qiao, Menominee, MI (US); Peter Vennema, Santa Fe, NM (US); Douglas W. Dooley, Menominee, MI (US); David Doll, Houston, TX (US)

(73) Assignee: L.E. JONES COMPANY, Menominee, MI (US)

( * ) Notice: Subject to any disclaimer, the term of this patent is extended or adjusted under 35 U.S.C. 154(b) by 319 days.

(21) Appl. No.: 13/955,798

(22) Filed: Jul. 31, 2013

(65) Prior Publication Data

US 2015/0034037 A1 Feb. 5, 2015

(51) Int. Cl.
*F01L 3/02* (2006.01)
*B23P 19/00* (2006.01)
*C21D 1/18* (2006.01)
(Continued)

(52) U.S. Cl.
CPC ................ *F01L 3/02* (2013.01); *B23P 19/00* (2013.01); *C21D 1/18* (2013.01); *C21D 5/00* (2013.01); *C21D 6/002* (2013.01); *C21D 6/004* (2013.01); *C21D 6/005* (2013.01); *C21D 6/007* (2013.01); *C21D 6/008* (2013.01); *C21D 9/0068* (2013.01); *C22C 38/02* (2013.01); *C22C 38/04* (2013.01); *C22C 38/44* (2013.01); *C22C 38/46* (2013.01); *C22C 38/48* (2013.01); *C22C 38/52* (2013.01); *C22C 38/54* (2013.01); *C22C 38/56* (2013.01); *C21D 2211/008* (2013.01); *Y10T 29/49306* (2015.01)

(58) Field of Classification Search
CPC ........... F01L 3/02; C21D 1/18; C21D 6/004; C21D 6/005; C21D 6/007; C21D 6/008; C22C 38/02; C22C 38/04; C22C 38/44; C22C 38/46; C22C 38/48; C22C 38/52; C22C 38/54; C22C 38/56
See application file for complete search history.

(56) References Cited

U.S. PATENT DOCUMENTS 1,375,255 A 4/1921 MacGregor et al.
1,599,425 A 9/1926 McGuire
(Continued)

FOREIGN PATENT DOCUMENTS

DE 102007017092 A1 10/2008

OTHER PUBLICATIONS

International Search Report and Written Opinion mailed Feb. 16, 2015 for PCT/US2014/046981.
(Continued)

*Primary Examiner* — Lindsay Low
*Assistant Examiner* — Jacob Amick
(74) *Attorney, Agent, or Firm* — Buchanan Ingersoll & Rooney PC

(57) ABSTRACT

An iron-based alloy includes, in weight percent, carbon from about 2 to about 3 percent; manganese from about 0.1 to about 0.4 percent; silicon from about 0.3 to about 0.8 percent; chromium from about 11.5 to about 14.5 percent; nickel from about 0.05 to about 0.6 percent; vanadium from about 0.8 to about 2.2 percent; molybdenum from about 4 to about 7 percent; tungsten from about 3 to about 5 percent; niobium from about 1 to about 3 percent; cobalt from about 3 to about 5 percent; boron from zero to about 0.2 percent; and the balance containing iron and incidental impurities. The alloy is suitable for use in elevated temperature applications such as in valve seat inserts for combustion engines.

20 Claims, 7 Drawing Sheets

(51) Int. Cl.
*C21D 6/00* (2006.01)
*C21D 9/00* (2006.01)
*C22C 38/02* (2006.01)
*C22C 38/04* (2006.01)
*C22C 38/44* (2006.01)
*C22C 38/46* (2006.01)
*C22C 38/48* (2006.01)
*C22C 38/52* (2006.01)
*C22C 38/54* (2006.01)
*C22C 38/56* (2006.01)
*C21D 5/00* (2006.01)

(56) References Cited

U.S. PATENT DOCUMENTS

| | | |
|---|---|---|
| 1,727,282 A | 9/1929 | Gill |
| 1,729,154 A | 9/1929 | Clawson |
| 1,911,173 A | 5/1933 | Colwell |
| 2,147,121 A | 2/1939 | Emmons |
| 2,370,124 A | 2/1945 | Charlton |
| 3,489,551 A | 1/1970 | Fletcher et al. |
| 3,859,083 A | 1/1975 | Kusaka et al. |
| 4,122,817 A | 10/1978 | Matlock |
| 5,316,596 A | 5/1994 | Kataoka |
| 6,436,338 B1 | 8/2002 | Qiao |
| 6,702,905 B1 * | 3/2004 | Qiao et al. ............ 148/326 |
| 6,916,444 B1 | 7/2005 | Liang |
| 7,288,157 B2 | 10/2007 | Kajinic et al. |
| 7,611,590 B2 * | 11/2009 | Liang ..................... 148/324 |

OTHER PUBLICATIONS

International Preliminary Report on Patentability issued in corresponding International Patent Application No. PCT/US2014/046981 on Feb. 11, 2016 (11 pages).

* cited by examiner (a)

(b)

(a)

(b)

2

IRON-BASED ALLOYS AND METHODS OF MAKING AND USE THEREOF

FIELD

The present disclosure relates to iron-based alloys, in particular to corrosion and wear-resistant iron-based alloys with high hardenability that may be used, for example, in valve seat inserts.

BACKGROUND INFORMATION

More restrictive exhaust emissions laws for diesel engines have driven changes in engine design including the need for high-pressure electronic fuel injection systems. Engines built according to the new designs use higher combustion pressures, higher operating temperatures and less lubrication than previous designs. Components of the new designs, including valve seat inserts (VSI), have experienced significantly higher wear rates. Exhaust valve seat inserts and valves, for example, must be able to withstand a high number of valve impact events and combustion events with minimal wear (e.g., abrasive, adhesive and corrosive wear). This has motivated a shift in materials selection toward materials that offer improved wear resistance relative to the valve seat insert materials that have traditionally been used by the diesel industry.

Another emerging trend in diesel engine development is the use of EGR (exhaust gas recirculation). With EGR, exhaust gas is routed back into the intake air stream to reduce nitric oxide ($NO_x$) content in exhaust emissions. The use of EGR in diesel engines can raise the operating temperatures of valve seat inserts. Accordingly, there is a need for lower cost exhaust valve seat inserts having good hot hardness for use in diesel engines using EGR.

Also, because exhaust gas contains compounds of nitrogen, sulfur, chlorine, and other elements that potentially can form acids, the need for improved corrosion resistance for alloys used in exhaust valve seat insert applications is increased for diesel engines using EGR. Acid can attack valve seat inserts and valves leading to premature engine failure.

There is a need for improved iron-based alloys for valve seat inserts that exhibit adequate hardenability, as well as corrosion and wear resistance suitable for use in, for example, exhaust valve seat insert applications.

SUMMARY

In embodiments, the present disclosure provides an iron-based alloy containing, in weight percent, carbon from about 2 to about 3 percent; manganese from about 0.1 to about 0.4 percent; silicon from about 0.3 to about 0.8 percent; chromium from about 11.5 to about 14.5 percent; nickel from about 0.05 to about 0.6 percent; vanadium from about 0.8 to about 2.2 percent; molybdenum from about 4 to about 7 percent; tungsten from about 3 to about 5 percent; niobium from about 1 to about 3 percent; cobalt from about 3 to about 5 percent; boron from zero to about 0.2 percent; and the balance containing iron and incidental impurities.

In embodiments, the present disclosure provides an iron-based alloy containing, in weight percent, carbon from about 2 to about 3 percent; manganese from about 0.1 to about 0.4 percent; silicon from about 0.3 to about 0.8 percent; chromium from about 11.5 to about 14.5 percent; nickel from about 0.05 to about 0.6 percent; vanadium from about 0.8 to about 2.2 percent; molybdenum from about 4 to about 7 percent; tungsten from about 3 to about 5 percent; niobium from about 1 to about 3 percent; cobalt from about 3 to about 5 percent; boron from zero to about 0.2 percent; and the balance containing iron and incidental impurities, where the alloy has interdendritic regions containing eutectic reaction phases, and when in a hardened and tempered condition, the alloy has a hardness of at least about 50 HRc.

In further embodiments, the present disclosure also provides a valve seat insert for use in an internal combustion engine. In embodiments, the valve seat insert is made of an iron-based alloy containing, in weight percent, carbon from about 2 to about 3 percent; manganese from about 0.1 to about 0.4 percent; silicon from about 0.3 to about 0.8 percent; chromium from about 11.5 to about 14.5 percent; nickel from about 0.05 to about 0.6 percent; vanadium from about 0.8 to about 2.2 percent; molybdenum from about 4 to about 7 percent; tungsten from about 3 to about 5 percent; niobium from about 1 to about 3 percent; cobalt from about 3 to about 5 percent; and boron from zero to about 0.2 percent; with the balance containing iron and incidental impurities.

DETAILED DESCRIPTION

Disclosed herein is an iron-based alloy useful as a valve seat insert which will now be described in detail with reference to a few embodiments thereof, as illustrated in the accompanying drawings. In the following description, numerous specific details are set forth in order to provide a thorough understanding of the iron-based alloy. It will be apparent, however, to one skilled in the art that embodiments herein may be practiced without some or all of these specific details. In other instances, well known process steps and/or structures have not been described in detail in order to not unnecessarily obscure the iron-based alloy.

Unless otherwise indicated, all numbers expressing quantities, conditions, and the like in the instant disclosure and claims are to be understood as modified in all instances by the term "about." The term "about" refers, for example, to numerical values covering a range of plus or minus 10% of the numerical value. The modifier "about" used in combination with a quantity is inclusive of the stated value.

In this specification and the claims that follow, singular forms such as "a", "an", and "the" include plural forms unless the content clearly dictates otherwise.

The terms "room temperature", "ambient temperature", and "ambient" refer, for example, to a temperature of from about 20° C. to about 25° C.

Figure 1:
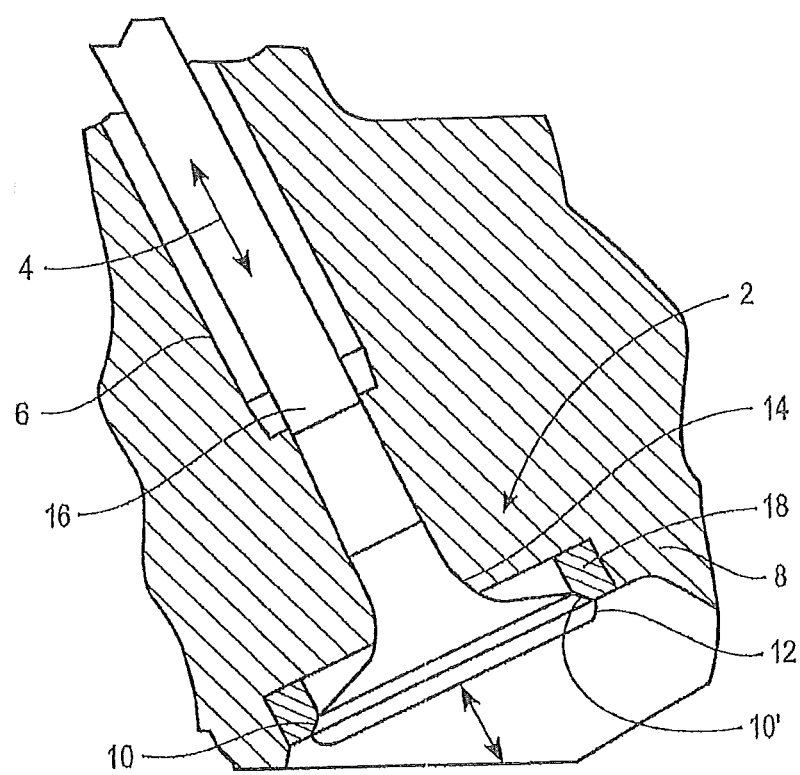
FIG. 1 is a cross-sectional view of a valve-assembly incorporating a valve seat insert of an iron-based alloy according to an embodiment of the instant application.

FIG. 1 illustrates an exemplary valve assembly 2 according to the present disclosure. Valve assembly 2 may include a valve 4, which may be slidably supported within the internal bore of a valve stem guide 6 and a valve seat insert 18. The valve stem guide 6 may be a tubular structure that fits into the cylinder head 8. Arrows illustrate the direction of motion of the valve 4. Valve 4 may include a valve seat face 10 interposed between the cap 12 and neck 14 of the valve 4. Valve stem 16 may be positioned above the neck 14 and may be received within valve stem guide 6. The valve seat insert 18 may include a valve seat insert face 10' and may be mounted, such as by press-fitting, within the cylinder head 8 of the engine. In embodiments, the cylinder head 8 may comprise a casting of, for example, cast iron, aluminum, or an aluminum alloy. In embodiments, the insert 18 (shown in cross-section) may be annular in shape, and the valve seat insert face 10' may engage the valve seat face 10 during movement of valve 4.

In embodiments, the present disclosure relates to an iron-based alloy (referred to hereafter as "J161 alloy" or "J161"). The hardenability, hot hardness, high temperature strength, corrosion resistance, and wear resistance of the J161 alloy make it useful in a variety of applications including, for example, as a valve seat insert for an internal combustion engine, and in ball bearings, coatings, and the like. In embodiments, the alloy is used as a valve seat insert for an internal combustion engine.

In embodiments, the J161 alloy comprises, in weight percent, carbon from about 2 to about 3 weight percent; manganese from about 0.1 to about 0.4 weight percent; silicon from about 0.3 to about 0.8 weight percent; chromium from about 11.5 to about 14.5 weight percent; nickel from about 0.05 to about 0.6 weight percent; vanadium from about 0.8 to about 2.2 weight percent; molybdenum from about 4 to about 7 weight percent; tungsten from about 3 to about 5 weight percent; niobium from about 1 to about 3 weight percent; cobalt from about 3 to about 5 weight percent; boron from zero to about 0.2 weight percent; and the balance including iron and incidental impurities. In embodiments, the balance includes iron and incidental impurities, and which may include up to about 1.5 weight percent other elements, such as aluminum, arsenic, bismuth, copper, calcium, magnesium, nitrogen, phosphorus, lead, sulfur, tin, titanium, yttrium and rare earth elements (lanthanides), zinc, tantalum, selenium, hafnium, and zirconium.

In embodiments, the J161 alloy consists essentially of, in weight percent, carbon from about 2.4 to about 2.7 percent; manganese from about 0.2 to about 0.3 percent; silicon from about 0.5 to about 0.7 percent; chromium from about 12 to about 13 percent; nickel from about 0.2 to about 0.4 percent; vanadium from about 1.2 to about 1.5 percent; molybdenum from about 5 to about 6 percent; tungsten from about 3.5 to about 4 percent; niobium from about 1.5 to about 2.5 percent; cobalt from about 3.5 to about 4 percent; boron from about 0.08 to about 0.2 percent; and the balance containing iron and incidental impurities. As used herein, the terms "consists essentially of" or "consisting essentially of" have a partially closed meaning—that is to say, such terms exclude steps, features, or components which would substantially and adversely change the basic and novel properties of the alloy (i.e., steps or features or components which would have a detrimental effect on the desired properties of the J161 alloy). The basic and novel properties of the J161 alloy may include at least one of the following: hardness, thermal conductivity, compressive yield strength, wear resistance, corrosion resistance, and microstructure (i.e., eutectic reaction phases in the interdendritic regions and tempered martensite in the intradendritic regions).

In embodiments, the J161 alloy may be processed to achieve a combination of hardness, wear resistance, and corrosion resistance suitable for valve seat inserts in the hardened and tempered condition. In embodiments, the J161 alloy may be processed according to any suitable method; for example, in embodiments, the J161 may be processed by conventional techniques including powder metallurgy, casting, thermal/plasma spraying, weld overlay, and the like.

In embodiments, the J161 alloy may be formed into a metal powder by any suitable technique. Various techniques for forming the alloy into a metal powder include, for example, ball milling elemental powders or atomization to form pre-alloyed powder. In embodiments, the powder material may be compacted into a desired shape and sintered. The sintering process may be used to achieve desired properties in the resulting part.

In embodiments, a valve seat insert may be manufactured by casting, which is a process involving melting alloy constituents and pouring the molten mixture into a mold. In embodiments, the alloy castings may be subsequently hardened and tempered before machining into a final shape. In embodiments, a valve seat insert may be manufactured by machining a piece of the J161 alloy.

In embodiments, the J161 alloy may be used in the manufacture of valve seat inserts, such as valve seat inserts for use in diesel engines (for example, diesel engines with or without EGR). In embodiments, the J161 alloy may be used in other applications including, for example, valve seat inserts made for gasoline, natural gas, bi-fuel, or alternatively fueled internal combustion engines. Such valve seat inserts may be manufactured by conventional techniques. In addition, the J161 alloy may find utility in other applications, including, for example, applications in which high temperature properties are advantageous, such as wear resistant coatings, internal combustion engine components, and diesel engine components.

In embodiments, the J161 may be hardened and tempered to obtain a fine solidification substructure formation. In embodiments, the microstructure of the J161 alloy contains intradendritic regions mainly composed of tempered martensite, with eutectic reaction phases existing in the interdendritic regions. The term "interdendritic" refers, for example, to the regions existing between the dendrites, and the term "intradendritic" refers, for example, to regions existing within the dendrites. In embodiments, the alloy contains a comparatively high carbon content (i.e., for example, in embodiments, the alloy may contain from about 2 to 3 weight percent carbon, such as from about 2.2 to about 2.8 weight percent carbon, or from about 2.4 to about 2.7 weight percent carbon, or about 2.5 weight percent carbon) which may promote eutectic formation in the interdendritic regions, rather than, for example, simple carbide formation. Without being bound to any particular theory, it is believed that the superior wear resistance properties and strength of the J161 alloy may be attributed to the microstructure of the alloy—that is to say, the presence of eutectic reaction phases, such as the eutectic reaction phases in the interdendritic regions of the J161 alloy, in combination with the tempered martensite in the intradendritic regions may give greater strength to the J161 alloy and improves wear resistance.

In embodiments, the J161 alloy may have a high level of hardenability. For example, in embodiments, the J161 alloy may be in a hardened and tempered condition and may have a bulk hardness of greater than about 50 HRc, such as greater than about 55 HRc, or greater than about 60 HRc, or greater than about 65 HRc. For instance, in embodiments, the J161 alloy may have a hardenability of from about 50 HRc to about 70 HRc, such as from about 55 HRc to about 65 HRc.

Thermal conductivity of valve seat insert materials influences their performance—a valve seat insert material with high thermal conductivity can more effectively transfer heat away from engine valves in order to prevent overheating. In embodiments, the J161 alloy may have a thermal conductivity of from about 18 W/m*K to about 27 W/m*K at temperatures from about 25° C. to about 700° C. For example, in embodiments, the J161 alloy may have a thermal conductivity of greater than about 18 W/m*K at a temperature of about 25° C., or greater than about 20 W/m*K at a temperature of about 100° C., or greater than about 21 W/m*K at a temperature of 200° C., or greater than about 23 W/m*K at a temperature of 300° C., or greater than about 24 W/m*K at 400° C., or greater than about 25 W/m*K at 500° C.

In embodiments, the J161 alloy may have a high ultimate tensile strength and compressive yield strength suitable for use in valve seat insert applications. In general, a greater ultimate tensile strength corresponds to a greater resistance to insert cracking, and a greater compressive yield strength corresponds to high valve seat insert retention. In embodiments, the J161 alloy may have a compressive yield strength of greater than about 150 ksi and a tensile strength of greater than about 80.3 ksi at a temperature of about 25° C. In embodiments, the tensile strength at 1200° C. may be greater than about 59.3 ksi, such as greater than about 60 ksi. In embodiments, the difference between the tensile strength at 25° C. and that at 1200° C. may be less than about 21 ksi, such as less than about 20 ksi. In embodiments, the difference between the tensile strength at 25° C. and the tensile strength at 1000° C. may be less than about 21 ksi, such as less than about 20 ksi, or less than about 19 ksi.

In embodiments, the J161 alloy may have a microhardness (as carried out with the Vickers HV10 scale under vacuum conditions) of greater than about 450 HV10 at a temperature of less than 1000° F. For example, in embodiments, the J161 alloy may have a microhardness (HV10) of at least 550 at a temperature of about 68° F. (20° F.), such as from about 555 HV10 to about 570 HV10, or from about 560 HV10 to about 565 HV10. In embodiments, the J161 alloy may have a microhardness at 200° C. of greater than about 540 HV10, such as greater than about 550 HV10, or from about 545 HV10 to 560 HV10, or from about 550 HV10 to about 555 HV10.

Carbon is an alloying element in the J161 alloy, which may affect alloy castability, microstructure, solidification substructure, and mechanical metallurgical behavior. Increasing carbon content can augment the hardenability of an iron-based alloy. The J161 contains a relatively high amount of carbon—without being bound to any particular theory, it is believed that the carbon content in the J161 alloy promotes eutectic formation (for example, the carbon content may promote eutectic formation in the interdendritic regions, as opposed to simple carbide formation), which contributes to the high wear resistance of the J161 alloy, as discussed above. In embodiments, carbon may be present in the J161 alloy in an amount of from about 2 to about 3 weight percent, such as from about 2.2 to about 2.8 weight percent, or from about 2.4 to about 2.7 weight percent.

In embodiments, boron may also be used in the J161 alloy as an effective alloying element to increase hardenability of the iron-based alloy system. Boron may also act as a grain refiner—fine grain and subgrain size improves not only the valve seat insert material wear performance, but also augments the bulk strength of the matrix. In embodiments, the J161 alloy may contain, for example, from zero to about 0.2 weight percent boron, such as from about 0.08 to about 0.2 weight percent boron, or from about 0.1 to about 0.15 weight percent boron.

Manganese is an austenite former and, in embodiments, may be present in the J161 alloy in an amount of, for example, from about 0.1 to about 0.4 weight percent, such as from about 0.2 to about 0.4 weight percent, or from about 0.2 to about 0.3 weight percent, or from about 0.25 to about 0.35 weight percent.

In embodiments, the silicon content in the J161 alloy is from about 0.3 to about 0.8 weight percent, such as from about 0.4 to about 0.7 weight percent silicon, or from about 0.5 to about 0.7 weight percent silicon, or from about 0.5 to about 0.6 weight percent silicon. In embodiments, silicon can affect the castability and mode of solidification of the alloy.

In embodiments, the alloy may contain chromium, a carbide and a ferrite former, in an amount of from about 11.5 to about 14.5 weight percent, such as from about 12 to about 13.5 weight percent chromium, or from about 12 to about 13 weight percent chromium, or from about 12.5 to about 13 weight percent chromium.

In embodiments, nickel, an austenite former, may be present in the J161 alloy in an amount of, for example, from about 0.05 to about 0.6 weight percent nickel, such as from about 0.15 to about 0.5 weight percent nickel, or from about 0.2 to about 0.4 weight percent nickel.

Vanadium is a carbide former and may, in embodiments, be present in the alloy in an amount of, for example, from about 0.8 to about 2.2 weight percent, such as from about 1 to about 1.8 weight percent vanadium, or from about 1.2 to about 1.5 weight percent vanadium, or from about 1.2 to about 1.4 weight percent vanadium.

In embodiments, molybdenum, which is also a carbide former, may be present in the alloy in an amount of, for example, from about 4 to about 7 weight percent molybdenum, such as from about 5 to about 6 weight percent molybdenum, or from about 5.1 to about 5.5 weight percent molybdenum.

In embodiments, the alloy may contain tungsten, which is also a strong carbide former, in a suitable amount, such as from about 3 to about 5 weight percent, or from about 3.4 to about 4.5 weight percent tungsten, or from about 3.5 to about 4 weight percent tungsten.

In embodiments, the J161 alloy may contain niobium, also a strong carbide former, in a suitable amount. For example, in embodiments, the J161 alloy may contain from about 1 to about 3 weight percent niobium, such as from about 1.5 to about 2.5 weight percent niobium, or from about 1.9 to about 2.3 weight percent niobium.

In embodiments, the J161 alloy may also contain cobalt, an austenite former, in a suitable amount. For example, in embodiments, the J161 alloy may contain from about 3 to about 5 weight percent cobalt, such as from about 3.2 weight percent to about 4.5 weight percent, or from about 3.5 to about 4 weight percent cobalt.

The iron-based alloy can have optional additions of other alloying elements, or may be free of intentional additions of such elements. In embodiments, the balance of the J161 alloy is iron and incidental impurities, which can include up to about 1.5 weight percent other elements, such as aluminum, arsenic, bismuth, copper, calcium, hafnium, magnesium, nitrogen, phosphorus, lead, sulfur, tin, titanium, yttrium and rare earth elements (also called lanthanides), zinc, tantalum, or zirconium. In embodiments, the J161 alloy contains less than about 1.5 weight percent impurities, such as less than about 1.0 weight percent impurities, or less than about 0.5 weight percent impurities, or less than about 0.3 weight percent impurities. In embodiments, the alloy is free of intentional additions of aluminum and/or titanium. The phrase "free of intentional additions" indicates, for example, that such elements are not intentionally added, but may be incidentally present due to processing materials and conditions. For example, elements such as copper or nickel may be present in stock used to make alloys. Further, because sulfur and phosphorus are common impurities which are removed during alloy preparation, complete elimination of these elements from the alloy may not be cost effective. In embodiments, the alloy may contain less than about 0.1 weight percent sulfur and/or less than about 0.1 weight percent phosphorus. In embodiments, the combined content of sulfur and phosphorus is less than 0.1 weight percent.

EXAMPLES

The examples set forth herein below are illustrative of different compositions and conditions that may be used in practicing the embodiments of the present disclosure. All proportions are by weight unless otherwise indicated. It will be apparent, however, that the embodiments may be practiced with many types of compositions and can have many uses in accordance with the disclosure above and as pointed out hereinafter.

The effects of compositional changes were explored by varying the composition of Heats 1-7 for the J161 alloy. The compositions of Heats 1-7 are shown in Table 1. Properties of the J161 alloys are discussed below. For comparative purposes, samples of an alloy J160 were also prepared according to the composition shown below in Table 1. Alloy J160 is an iron-based martensite matrix alloy which may be used for a wide spectrum of valve seat insert applications.

TABLE 1

Composition of Alloys (wt. %) Experimental Heats

| HEAT | C | Si | Mn | Cr | Mo | W | Co | V | Nb | Ni | Fe | B |
|---|---|---|---|---|---|---|---|---|---|---|---|---|
| 1 | 2.67 | 0.51 | 0.23 | 12.62 | 5.17 | 3.80 | 3.70 | 1.20 | 1.95 | 0.34 | Bal. | 0.161 |
| 2 | 2.48 | 0.65 | 0.32 | 12.65 | 5.21 | 3.75 | 3.60 | 1.23 | 2.06 | 0.34 | Bal. | 0.170 |
| 3 | 2.48 | 0.62 | 0.30 | 12.96 | 5.22 | 3.84 | 3.66 | 1.25 | 2.00 | 0.32 | Bal. | 0.122 |
| 4 | 2.54 | 0.53 | 0.26 | 12.60 | 5.41 | 3.99 | 3.68 | 1.31 | 2.06 | 0.35 | Bal. | 0.076 |
| 5 | 2.52 | 0.54 | 0.29 | 13.07 | 5.39 | 4.02 | 3.82 | 1.24 | 2.23 | 0.29 | Bal. | 0.086 |
| 6 | 2.52 | 0.54 | 0.27 | 13.06 | 5.41 | 3.93 | 3.98 | 1.32 | 1.99 | 0.30 | Bal. | 0.114 |
| 7 | 2.40 | 0.59 | 0.26 | 12.55 | 5.31 | 3.67 | 3.53 | 1.21 | 1.97 | 0.22 | Bal. | 0.193 |
| J160 | 1.45 | 0.60 | 0.30 | 12.75 | 5.25 | 4.00 | 3.50 | 1.25 | 2.00 | 0.40 | Bal. | — |

Example 1

Tempering Response

The tempering response of the J161 and J160 alloys was analyzed by conducting a hardening step followed by a tempering step—that is, the tempering response of the alloys was analyzed by hardening for about 2.5 hours, followed by tempering for about 3.5 hours at varying temperatures. The J160 and J161 alloys were tested under two hardening temperatures, 1550° F. and 1750° F. for 2.5 hours and air-cooled. The samples were at room temperature before proceeding to the tempering step. The thirteen tempering temperatures evaluated in this study ranged at 100° F. intervals from 300° F. through 1500° F. (that is, 300° F., 400° F., 500° F., 600° F., 700° F., 800° F., 900° F., 1000° F., 1100° F., 1200° F., 1300° F., 1400° F., and 1500° F.). The 75° F. hardness data reflects the as-hardened condition (equivalent to the condition of tempering at the lab ambient). The hardness measurement results from the samples with different heat treatment conditions are summarized in Table 2, and illustrated in FIG. 2.

TABLE 2

Summary of Hardness Measurements (HRC) with Different Heat Treatment Conditions

| Tempering Temperature (° F.) | Bulk Hardness (HRc) | | | |
|---|---|---|---|---|
| | J160 hardened at 1750° F. | J160 hardened at 1550° F. | J161 (Heat 1) hardened at 1750° F. | J161 (Heat 1) hardened at 1550° F. |
| 75 | 59.6 | 53.7 | 66.8 | 64.1 |
| 300 | 59.6 | 53.7 | 66.2 | 64.9 |
| 400 | 59.2 | 54.5 | 65.1 | 64.4 |
| 500 | 59.2 | 54.5 | 64.9 | 65.0 |
| 600 | 59.4 | 54.5 | 65.3 | 64.0 |
| 700 | 59.6 | 54.6 | 65.4 | 64.4 |
| 800 | 59.9 | 54.4 | 65.6 | 64.1 |
| 900 | 59.3 | 54.3 | 65.6 | 64.7 |
| 1000 | 57.2 | 51.4 | 64.4 | 62.5 |
| 1100 | 49.0 | 45.1 | 59.0 | 56.2 |
| 1200 | 45.8 | 45.2 | 53.0 | 54.2 |
| 1300 | 45.5 | 45.0 | 53.1 | 53.0 |
| 1400 | 44.5 | 44.1 | 50.5 | 51.5 |
| 1500 | 41.9 | 43.4 | 51.1 | 53.8 |

As shown in the measurements at the 75° F. tempering temperature (i.e., at lab ambient, reflecting the as-hardened bulk hardness), hardening at 1750° F. resulted in greater as-hardened bulk hardness than hardening at 1550° F. for both the J161 and J160 alloys. However, the as-hardened bulk hardness was greater for J161 than J160—that is to say, the as-hardened bulk hardness of the J161 alloy hardened at 1750° F. was greater than that of the J161 alloy hardened at 1550° F., but the as-hardened bulk hardness of the J161 alloy hardened at 1550° F. was greater than that of the J160 alloy hardened at either 1750° F. or 1550° F. Moreover, the difference between the as-hardened bulk hardness of the J160 alloy hardened at 1750° F. and the J160 alloy hardened at 1550° F. was much more pronounced than that between the two J161 alloys—specifically, the difference between the J160 samples was more than twice that of the J161 samples (5.9 HRc for the J160 samples, as compared to 2.7 HRc for the J161 samples).

Figure 2:
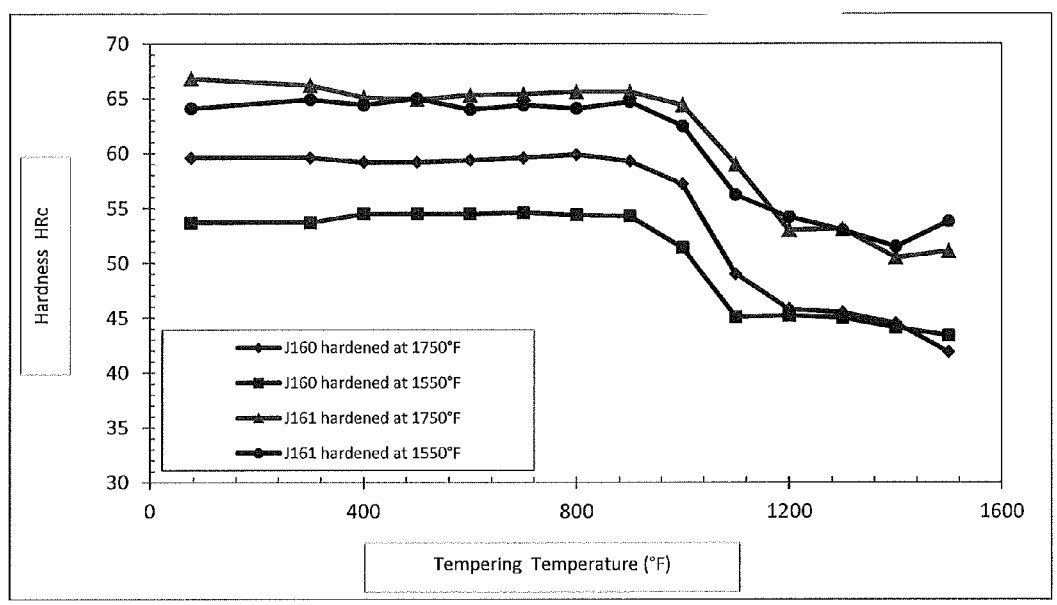
FIG. 2 is a graphical representation of the bulk hardness as a function of tempering temperature for an iron-based alloy according to the instant disclosure ("J161 alloy" or "J161") hardened at 1750° F. and the J161 alloy hardened at 1550° F., as compared to that of a comparative iron-based martensite matrix alloy ("J160 alloy" or "J160") hardened at 1750° F. and the J160 alloy hardened at 1550° F.

The tempered hardness as a function of tempering temperature for both J160 and J161 is illustrated in FIG. 2. Alloy J161 hardened at 1750° F. showed a slightly higher hardenability than the J161 alloy hardened at 1550° F., but the difference in hardness between the two alloys for each hardening temperature was essentially insignificant. In contrast, there was a significant difference in hardness between the J160 alloy hardened at 1750° F. and the J160 alloy hardened at 1550° F. from ambient temperature through the 1100° F. temperature range. These results show a significant difference in hardenability between the J160 and J161 alloys.

As shown in FIG. 2, the stabilized hardness temperature range for both J160 and J161 was from about 1100° F. through about 1500° F. The stabilized hardness for the J160 alloy in this range was from about HRc 51.9 through HRc 49.0, while the stabilized hardness for the J161 alloy was from about HRc 50.5 through HRc 59.0. Generally, the tempering temperature for a martensitic VSI alloy should be selected in the temperature range with stabilized hardness.

Example 2

Thermal Physical Property

The thermal expansion coefficient ("CTE") of J161 (Heat 3) was measured in an argon atmosphere at a temperature of from ambient temperature to about 600° C. For comparative purposes, the thermal expansion coefficient of another valve seat insert alloy (J160) was also analyzed. The results of this analysis are summarized in Table 3.

TABLE 3

Linear Thermal Expansion Coefficient of Alloys J160 and J161 (Heat 3)

| Temperature | | CTE of Alloy J160 | | CTE of Alloy J161 | |
|---|---|---|---|---|---|
| ° C. | ° F. | ×10$^{-6}$ mm/mm° C. | ×10$^{-6}$ mm/mm° F. | ×10$^{-6}$ mm/mm° C. | ×10$^{-6}$ mm/mm° F. |
| 25-200 | 77-392 | 10.45 | 5.81 | 11.39 | 6.33 |
| 25-300 | 77-572 | 11.03 | 6.13 | 11.76 | 6.53 |
| 25-400 | 77-752 | 11.41 | 6.34 | 12.33 | 6.85 |
| 25-500 | 77-932 | 11.86 | 6.59 | 12.96 | 7.20 |
| 25-600 | 77-1112 | 12.07 | 6.71 | 13.54 | 7.52 |

The differences between the CTE values measured for the J160 alloy and the J161 alloy are likely related to the differences in their microstructures. The thermal physical property for both alloys was considered to be sound for internal combustion engine valve seat insert applications.

The thermal conductivity of the J161 alloy was also compared with that of the J160 alloy. The thermal conductivity was measured using a NETZSCH LFA 457 Microflash™ instrument at the NETZSCH Instruments Applications Laboratory. A comparison between the thermal conductivity of the J161 alloy and the J160 alloy is summarized in Table 4.

TABLE 4

Thermal Conductivity of Alloys J160 and J161

| Temperature | | Specific Heat J/g * K | | Conductivity W/m * K | | Btu/hr-ft-° F. | |
|---|---|---|---|---|---|---|---|
| ° C. | ° F. | J160 | J161 | J160 | J161 | J160 | J161 |
| 25 | 77 | 0.431 | 0.460 | 16.8 | 18.5 | 9.7 | 10.7 |
| 100 | 212 | 0.487 | 0.479 | 18.5 | 20.3 | 10.7 | 11.7 |
| 200 | 392 | 0.527 | 0.509 | 20.8 | 21.8 | 12.0 | 12.6 |
| 300 | 572 | 0.567 | 0.539 | 22.4 | 23.2 | 12.9 | 13.4 |
| 400 | 752 | 0.609 | 0.570 | 23.9 | 24.3 | 13.8 | 14.0 |
| 500 | 932 | 0.690 | 0.608 | 24.4 | 25.1 | 14.1 | 14.5 |
| 600 | 1112 | 0.772 | 0.668 | 24.9 | 26.1 | 14.4 | 15.1 |
| 700 | 1292 | 0.587 | 0.714 | 25.4 | 25.1 | 14.7 | 14.5 |

Thermal conductivity of valve seat insert materials may affect their performance—for example, a valve seat insert material with high thermal conductivity can effectively transfer heat away from engine valves to prevent overheating. As demonstrated in Table 4, the J161 alloy showed an approximately equivalent or higher thermal conductivity as compared to the J160 alloy at all temperature ranges evaluated. As with the CTE, the differences in the thermal property are believed to be related to the differences in the microstructures of the alloys, which are discussed in more detail below.

Example 3

Tension and Compression

Samples of the J161 alloy (Heat 2) were evaluated to determine tensile strength following ASTM E21-09 (Standard Test Methods for Elevated Temperature Tension Tests of Metallic Materials) at six temperature points up to 1200° C. For comparative purposes, samples of the J160 alloy were also evaluated. The results of the tensile strength analysis are summarized in Table 5.

TABLE 5

Tensile Test Results of Alloys J160 and J161

| Temperature | | UTS ksi | | Young's Modulus of Elasticity msi | | Poisson's Ratio | |
|---|---|---|---|---|---|---|---|
| ° C. | ° F. | J160 | J161 | J160 | J161 | J160 | J161 |
| 25 | 77 | 161.2 | 80.3 | 32.9 | 32.8 | 0.281 | 0.2667 |
| 600 | 316 | 135.3 | 74.5 | 30.5 | 32.3 | — | — |

TABLE 5-continued

Tensile Test Results of Alloys J160 and J161

| Temperature | | UTS ksi | | Young's Modulus of Elasticity msi | | Poisson's Ratio | |
|---|---|---|---|---|---|---|---|
| ° C. | ° F. | J160 | J161 | J160 | J161 | J160 | J161 |
| 800 | 427 | 95.7 | 69.7 | 34.2 | 29.6 | — | — |
| 1000 | 538 | 96.9 | 61.3 | 24.5 | 25.4 | — | — |
| 1100 | 593 | — | 58.8 | — | 22.2 | — | — |
| 1200 | 649 | — | 59.3 | — | 17.7 | — | — |

Samples of the J161 alloy were evaluated to determine compressive yield strength following ASTM E9-89a (2000) (Standard Test Methods of Compression Testing of Metallic Materials at Room Temperature (Withdrawn 2009)) at six temperature points up to 1200° C. For comparative purposes, samples of the J160 alloy were also evaluated. The results of the compressive yield strength analysis (CYS) are summarized in Table 6.

TABLE 6

COMPRESSION TEST RESULTS OF ALLOYS J160 (5G05XA) AND J161 (Heat 2)

| Temperature | | CYS ksi | | Young's Modulus of Elasticity msi | | Poisson's Ratio | |
|---|---|---|---|---|---|---|---|
| ° C. | ° F. | J160 | J161 | J160 | J161 | J160 | J161 |
| 25 | 77 | 142.6 | 157.7 | 37.0 | 33.8 | 0.274 | 0.2763 |
| 600 | 316 | 143.8 | 136.2 | 33.9 | 28.9 | — | — |
| 800 | 427 | 139.7 | 128.3 | 20.9 | 28.9 | — | — |
| 1000 | 538 | 121.2 | 107.5 | 19.7 | 24.6 | — | — |
| 1100 | 593 | — | 91.8 | — | 21.9 | — | — |
| 1200 | 649 | — | 69.0 | — | 21.6 | — | — |

With respect to valve insert rupture resistance, in general, a greater ultimate tensile strength corresponds to a greater resistance to insert cracking. As shown in Table 5, while the J160 alloy generally possessed a greater ultimate tensile strength than the J161 alloy, the J161 alloy showed satisfactory ultimate tensile strength with very slow decreasing rate when the test temperature was increased from ambient to 1200° F.

Greater compressive yield strength corresponds with higher valve seat insert retention—accordingly, because the J161 alloy demonstrated greater compressive yield strength when the test temperature was lower than 1000° C. (as demonstrated in Table 6), the J161 alloy demonstrated a higher insert retention capability.

Example 4

Microhardness

Samples of the J161 alloy from Heat 3 were evaluated for hot hardness at temperatures up to 1600° C. (871° F.) with the Vickers hardness testing technique following ASTM E92-82 (2003) (Standard Test Method for Vickers Hardness of Metallic Materials) under vacuum condition. For comparative purposes, the J160 alloy was also tested for hot hardness. The results of the microhardness testing analysis are summarized in Table 7.

TABLE 7

Microhardness Measurement Results for the J160 and J161 Alloys

| Temperature | | Microhardness (HV10) | |
|---|---|---|---|
| °F. | °C. | J160 | J161 (0C11Z) |
| 68 | 20 | 525 | 564 |
| 200 | 93 | 518 | 554 |
| 400 | 204 | 513 | 511 |
| 600 | 316 | 477 | 488 |
| 800 | 427 | 443 | 457 |
| 1000 | 538 | 410 | 386 |
| 1200 | 649 | 307 | 268 |
| 1400 | 760 | 233 | 153 |
| 1600 | 871 | 133 | 129 |

As demonstrated in Table 7, microhardness significantly reflected the effect of strengthening phases. Both J160 and J161 showed a sound microhardness from ambient temperature through 1600° F. When the test temperature was lower than 1000° F., J161 showed an overall higher microhardness than J160.

Example 5

Wear Resistance

Wear resistance analysis of the J161 alloy was conducted on a Plint Model TE77 Tribometer, which can accurately predict wear resistance under simulated service conditions during testing in diesel and natural gas engines. The plint test was a pin-on-plate test for which the pin specimen was made with valve seat insert alloys, while the plate specimen was extracted from actual valve material.

The wear resistance analysis was conducted on a Plint Model TE77 Tribometer that can accurately predict wear resistance under simulated service conditions during testing in diesel and natural gas engines. The wear resistance analysis was conducted by sliding pin-shaped samples of J161 (Heat 2) and J160 against a plate sample of 23-8N (a commercially available steel typically used in intake valves, containing, in weight percent, 0.3 to 0.35 percent carbon, 3 to 4 percent manganese, 0.6 to 0.9 percent silicon, 22 to 24 percent chromium, 7 to 9 percent nickel, 0.3 to 0.34 percent nitrogen, and the balance iron). Testing was conducted at a set of temperature points following ASTM G133 (standard test method of determining sliding wear of wear-resistant materials using a linearly reciprocating ball-on-flat geometry). A force of 20N was applied on the pin-shaped sample against a plate sample while sliding the pin sample by a 1 mm sliding length at 20 Hz over a temperature range (room temperature through 500° C.) for 100,000 cycles.

Figure 3:
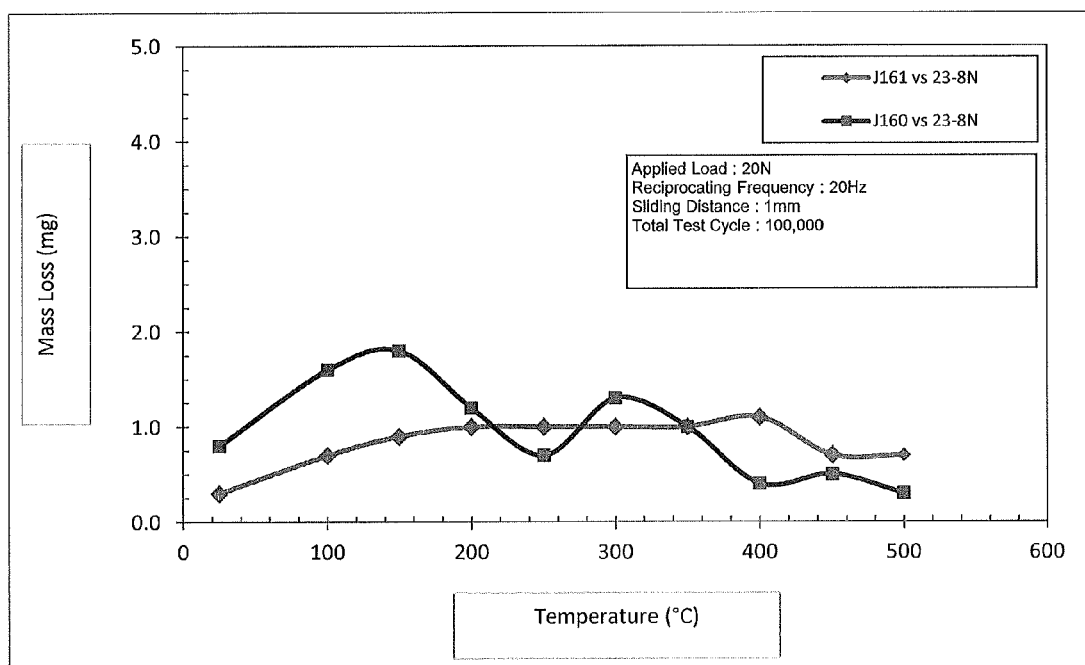
FIG. 3 is a graphical representation of the results of wear resistance analysis, showing pin specimen wear as a function of test temperature for the J161 alloy vs. 23-8N, as compared to the J160 alloy vs. 23-8N. As used herein, "23-8N" refers to a commercially-available austenitic chromium-nickel alloy containing, in weight percent, 0.3 to 0.35 percent carbon, 3 to 4 percent manganese, 0.6 to 0.9 percent silicon, 22 to 24 percent chromium, 7 to 9 percent nickel, 0.3 to 0.34 percent nitrogen, and the balance iron.
Figure 4:
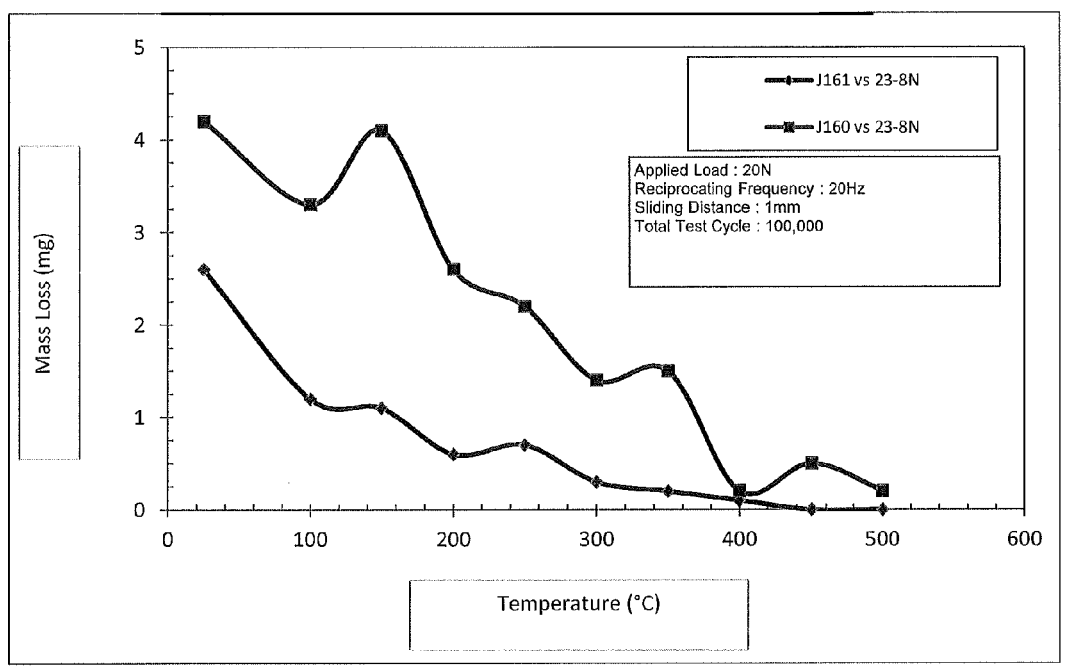
FIG. 4 is a graphical representation of the results of wear resistance analysis, showing plate specimen wear as a function of test temperature for the J161 alloy vs. 23-8N, as compared to the J160 alloy vs. 23-8N.
Figure 5:
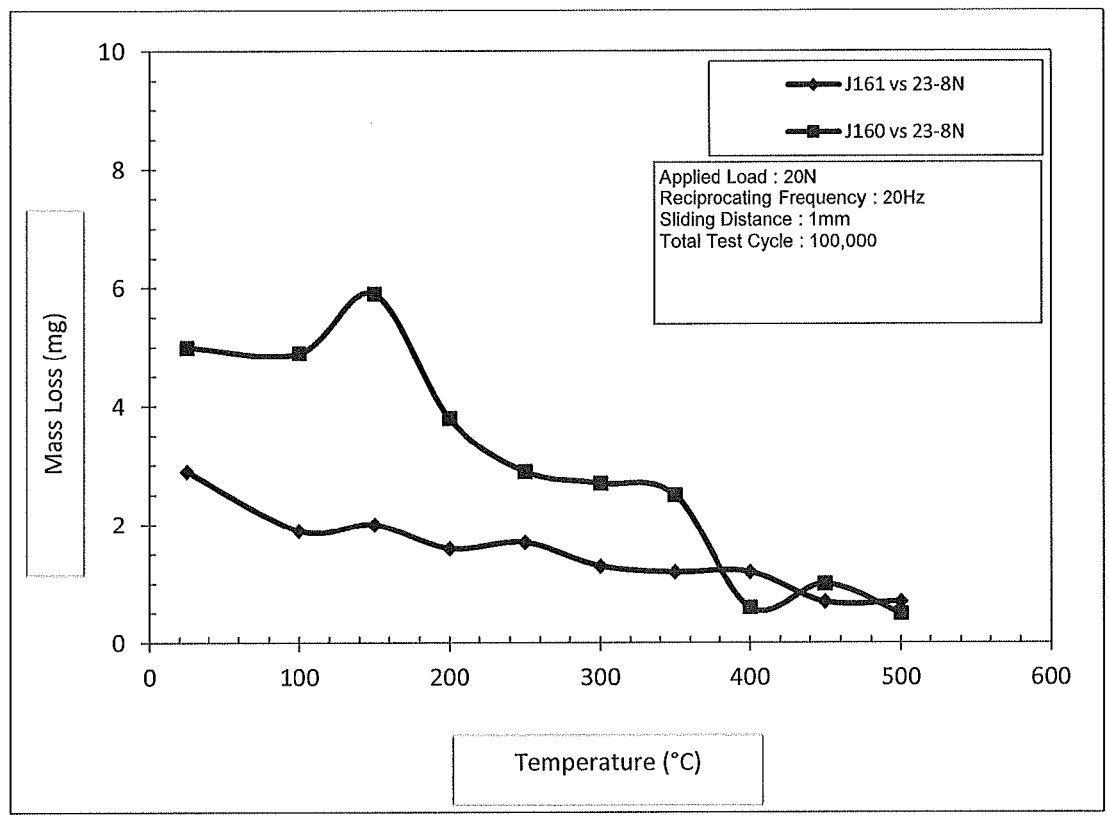
FIG. 5 is a graphical representation of the results of wear resistance analysis, showing total (pin+plate) wear as a function of test temperature for the J161 alloy vs. 23-8N, as compared to the J160 alloy vs. 23-8N.

The test results of pin specimen, plate specimen, and total materials (pin+plate wear) for the J160 and J161 alloys versus J23-8N are presented in FIGS. 3, 4, and 5, respectively (applied load: 20N; reciprocating frequency: 20 Hz; sliding distance: 1 mm; total test cycles: 100,000). As shown in FIG. 3, the J161 and J160 alloys demonstrated similar pin specimen wear. For plate and total materials wear, J161 vs. 23-8N showed significantly less wear compared to J160 vs. 23-8N within the test temperature range from room temperature through 500° C. Without being bound to any particular theory, it is believed that the superior wear resistance exhibited by the J161 alloy as compared to the J160 alloy may be attributed to the differences in its microstructure, which are discussed in more detail below.

Example 6

Evaluation of the Microstructure

FIG. 6A is an optical micrograph the microstructural morphology of an embodiment of the as-cast J161 alloy (Heat 5) at 100× magnification (FIG. 6B shows the alloy at 500× magnification). As shown in FIGS. 6A/6B, under the hardened and tempered condition, the 161 alloy features intradendritic regions mainly composed of tempered martensite, with eutectic reaction phases existing in the interdendritic regions.

Figure 6:
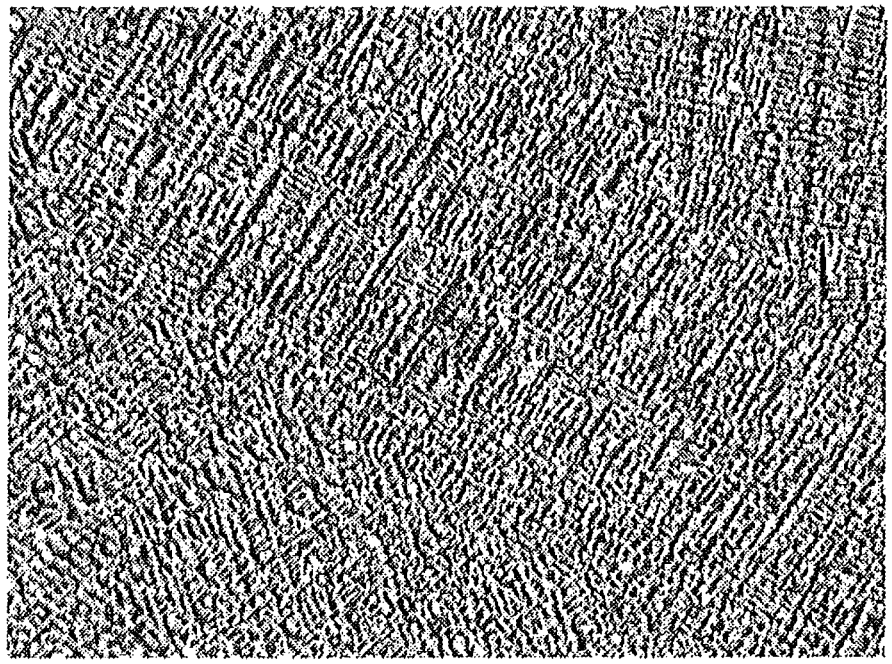
FIGS. 6A and 6B are optical micrographs at 100× and 500×, respectively, of the J161 alloy (Heat 5) in the hardened (1550° F./2.5 hours) plus tempered (1325° F./3.5 hours) condition.
Figure 6:
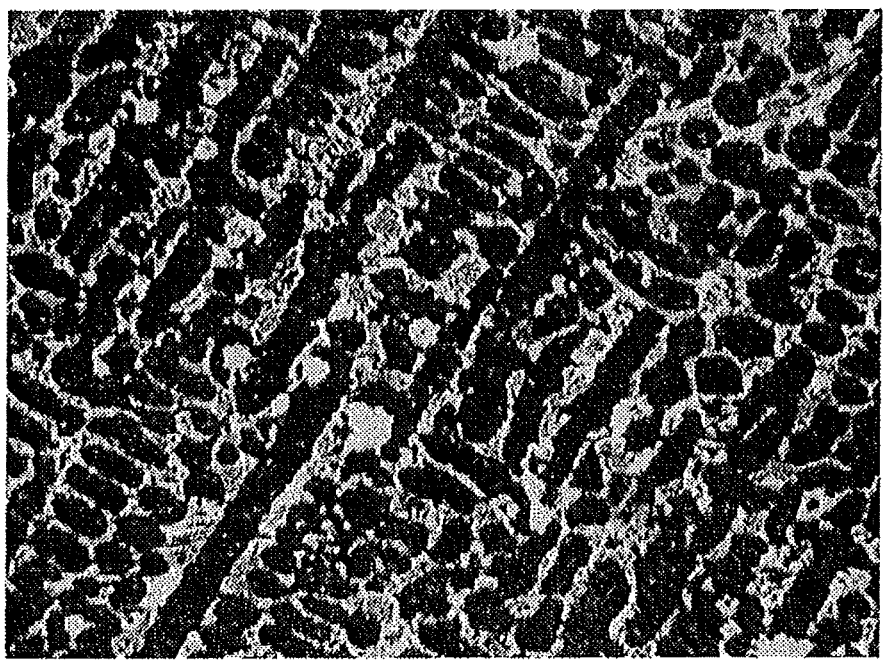
Figure 7:
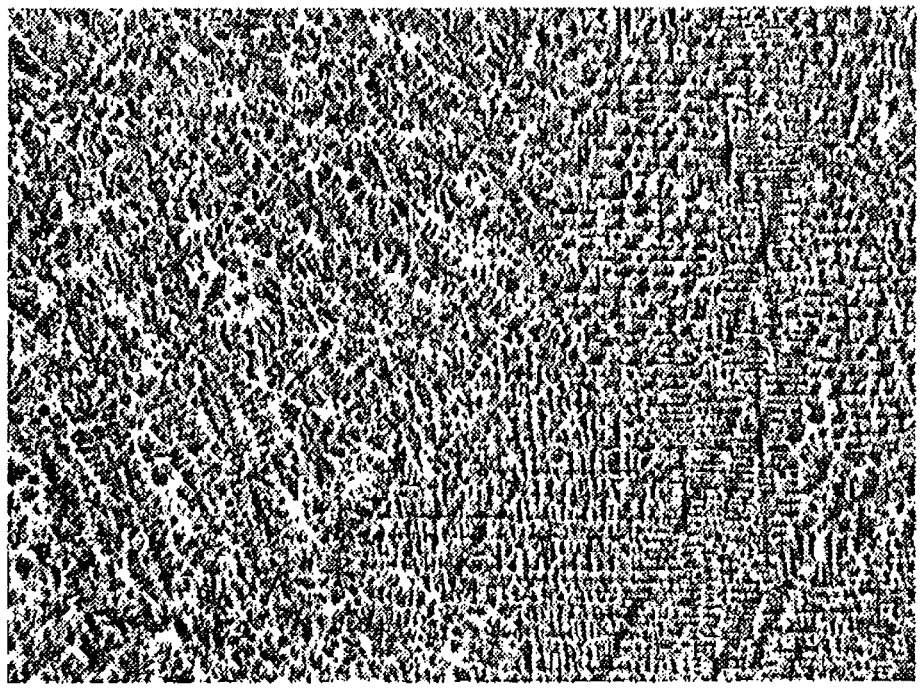
FIGS. 7A and 7B are optical micrographs at 100× and 500×, respectively, of the J160 alloy in the hardened (1550° F./2.5 hours) plus tempered (1325° F./3.5 hours) condition.
Figure 7:
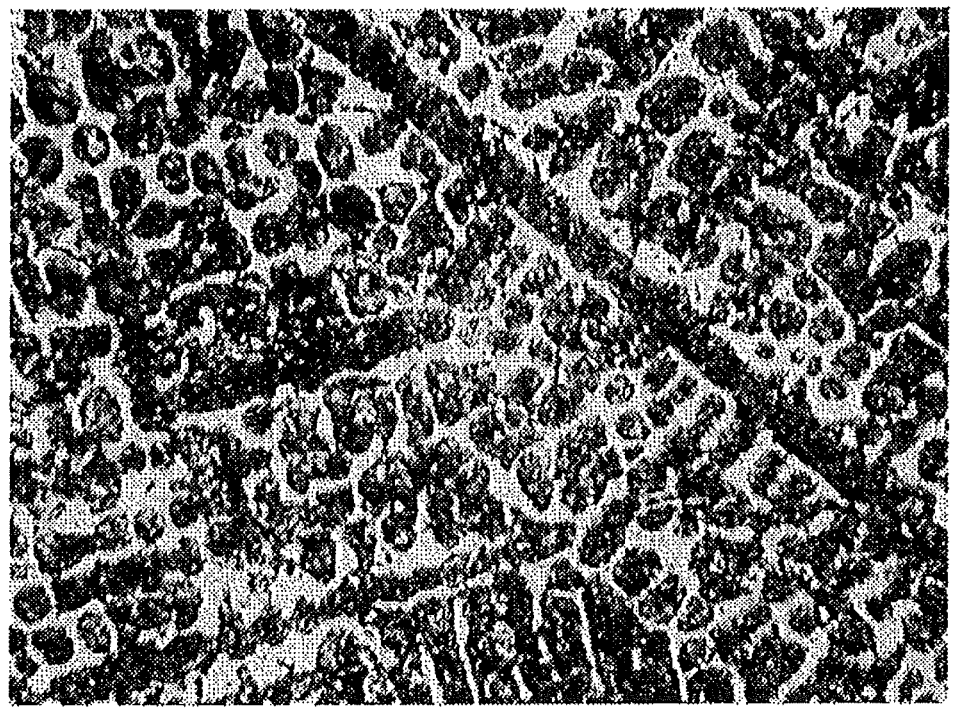

For comparative purposes, FIG. 7A illustrates the microstructural morphology of the as-cast J160 alloy at 100× magnification (FIG. 6B shows the alloy at 500× magnification). As demonstrated in FIGS. 6 and 7, J161 possesses a finer solidification substructure formation compared to J160 under the same thermal treatment condition. Both the J160 and the J161 alloys feature intradendritic regions mainly composed of tempered martensite, but the interdendritic regions of the J160 alloy contain primarily solid solution phase and network carbides under the hardened plus tempered condition (as opposed to eutectic reaction phases, as seen in the J161 alloy). That is to say, the J160 and J161 alloys showed different microstructures in the interdendritic regions, and the J161 alloy showed a greater capability to form finer and more uniform solidification structures.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. An iron-based alloy comprising, in weight percent:
carbon from about 2 to about 3 percent;
manganese from about 0.1 to about 0.4 percent;
silicon from about 0.3 to about 0.8 percent;
chromium from 11.5 to about 14.5 percent;
nickel from about 0.05 to about 0.6 percent;
vanadium from about 0.8 to about 2.2 percent;
molybdenum from about 4 to about 7 percent;
tungsten from about 3 to about 5 percent;
niobium from about 1 to about 3 percent;
cobalt from about 3 to about 5 percent;
boron from zero to about 0.2 percent; and
balance iron and incidental impurities wherein a total molybdenum and tungsten content is 10 percent or less.

2. The alloy according to claim 1, wherein the carbon content of the alloy is from about 2.4 to about 2.7 weight percent and a total carbon and silicon content is 2.7 to 3.5 percent.

3. The alloy according to claim 1, wherein the alloy contains at least about 0.08 weight percent boron and a total molybdenum and tungsten content is 8.6 to 9.5 percent.

4. The alloy according to claim 1, wherein the alloy contains at least about 2.4 weight percent carbon, at least about 0.08 weight percent boron and a total carbon and silicon content is 2.7 to 3.5 percent.

5. The alloy according to claim 1, wherein the cobalt content of the alloy is from about 3.5 to about 4 weight percent.

6. The alloy according to claim 1, wherein the alloy comprises intradendritic regions containing tempered martensite, interdendritic regions comprising eutectic reaction phases and a total carbon and silicon content is 2.3 to 3.4 percent.

7. The alloy according to claim 1, wherein the alloy is in a hardened and tempered condition and has a hardness of from about 50 to about 59 Rockwell C.

8. The alloy according to claim 1, wherein the alloy is in a hardened and tempered condition and has a hardness of at least about 55 Rockwell C.

9. The alloy according to claim 1, wherein the alloy has a microhardness (HV10) of at least 550 at a temperature of about 200° F.

10. The alloy according to claim 1, wherein the alloy consists essentially of, in weight percent:
    carbon from about 2.4 to about 2.7 percent;
    manganese from about 0.2 to about 0.3 percent;
    silicon from about 0.5 to about 0.7 percent;
    chromium from 12 to about 13 percent;
    nickel from about 0.2 to about 0.4 percent;
    vanadium from about 1.2 to about 1.5 percent;
    molybdenum from about 5 to about 6 percent;
    tungsten from about 3.5 to about 4 percent;
    niobium from about 1.5 to about 2.5 percent;
    cobalt from about 3.5 to about 4 percent;
    boron from about 0.08 to about 0.2 percent; and
    balance iron and incidental impurities and a total carbon and silicon content is 2.7 to 3.5 percent.

11. A part for an internal combustion engine comprising the alloy according to claim 1.

12. The alloy according to claim 1, wherein the alloy comprises and a total carbon and silicon content is 2.3 to 3.5 percent and a microstructure of interdendritic regions comprising eutectic reaction phases; and the alloy in a hardened and tempered condition has a hardness of at least about 50 HRc.

13. A valve seat insert for use in an internal combustion engine, the valve seat insert made of an iron-based alloy comprising, in weight percent:
    carbon from about 2 to about 3 percent;
    manganese from about 0.1 to about 0.4 percent;
    silicon from about 0.3 to about 0.8 percent;
    chromium from 11.5 to about 14.5 percent;
    nickel from about 0.05 to about 0.6 percent;
    vanadium from about 0.8 to about 2.2 percent;
    molybdenum from about 4 to about 7 percent;
    tungsten from about 3 to about 5 percent;
    niobium from about 1 to about 3 percent;
    cobalt from about 3 to about 5 percent;
    boron from zero to about 0.2 percent; and
    balance iron and incidental impurities wherein a total molybdenum and tungsten content is 10 percent or less.

14. The valve seat insert according to claim 13, wherein the alloy contains at least about 0.08 weight percent boron, and the carbon content of the alloy is from about 2.4 to about 2.7 weight percent and a total carbon and silicon content is 2.7 to 3.5 percent.

15. The valve seat insert according to claim 13, wherein the alloy consists essentially of, in weight percent,
    carbon from about 2.4 to about 2.7 percent;
    manganese from about 0.2 to about 0.3 percent;
    silicon from about 0.5 to about 0.7 percent;
    chromium from 12 to about 13 percent;
    nickel from about 0.2 to about 0.4 percent;
    vanadium from about 1.2 to about 1.5 percent;
    molybdenum from about 5 to about 6 percent;
    tungsten from about 3.5 to about 4 percent;
    niobium from about 1.5 to about 2.5 percent;
    cobalt from about 3.5 to about 4 percent;
    boron from about 0.08 to about 0.2 percent; and
    balance iron and incidental impurities and a total molybdenum and tungsten content is 8.6 to 9.5 percent.

16. A method of manufacturing the valve seat insert of claim 13, the method comprising:
    casting the iron-based alloy; and
    machining the casting.

17. A method of manufacturing the valve seat insert of claim 13, the method comprising:
    hardening the iron-based alloy at a temperature of from about 1550° F. to about 1750° F.; and
    tempering the as-hardened alloy at a temperature of from about 300° F. to about 1500° F.

18. A method of manufacturing an internal combustion engine, the method comprising inserting the valve seat insert of claim 13 in a cylinder head of the internal combustion engine.

19. The method according to claim 18, wherein the internal combustion engine is selected from the group consisting of diesel engines and natural gas engines.

20. A method of operating an internal combustion engine comprising:
    closing a valve against the valve seat insert according to claim 13 to close a cylinder of the internal combustion engine; and
    igniting fuel in the cylinder to operate the internal combustion engine.

* * * * *